United States Patent [19]
Tausheck

[11] 3,790,003
[45] Feb. 5, 1974

[54] TILTABLE GLASS CUTTING TABLE
[75] Inventor: Russell W. Tausheck, Hayward, Calif.
[73] Assignee: ACE Glass Co., Hayward, Calif.
[22] Filed: Nov. 15, 1972
[21] Appl. No.: 306,719

[52] U.S. Cl. .............................. 214/1 S, 214/1 Q
[51] Int. Cl. .............................................. B65g 7/00
[58] Field of Search. 214/1 Q, 1 S, 1 D, 1 SW, 1 H, 214/7, 1 BV, 130 R, 6 DS, 6 RS

[56] References Cited
UNITED STATES PATENTS
| | | | |
|---|---|---|---|
| 3,051,331 | 8/1962 | Schram | 214/1 S |
| 3,391,805 | 7/1968 | Baden | 214/6 FS |
| 3,458,057 | 7/1969 | Stefan et al. | 214/1 Q |

FOREIGN PATENTS OR APPLICATIONS
| | | | |
|---|---|---|---|
| 553,000 | 12/1956 | Italy | 214/1 D |

*Primary Examiner*—Frank E. Werner
*Attorney, Agent, or Firm*—William R. Piper

[57] ABSTRACT

A power operated tiltable glass cutting table with novel means for removing a large sheet of glass from either a front opened or end opened case while the table top is inclined at a slight angle from a vertical position and without the operator having to touch the glass. The lower edge of the table top when in an upwardly inclined position is provided with retractable rubber rollers upon which the lower edge of the large sheet of glass rests preparatory to returning the table top to a horizontal position. A plurality of free revolvable spherical balls are arranged in spaced apart relation over the entire upper surface of the table top and are normally spaced above the table top so as to support the glass and permit the ready movement of the glass sheet over the table top. A single operator can handle a large sheet of glass with safety.

15 Claims, 13 Drawing Figures

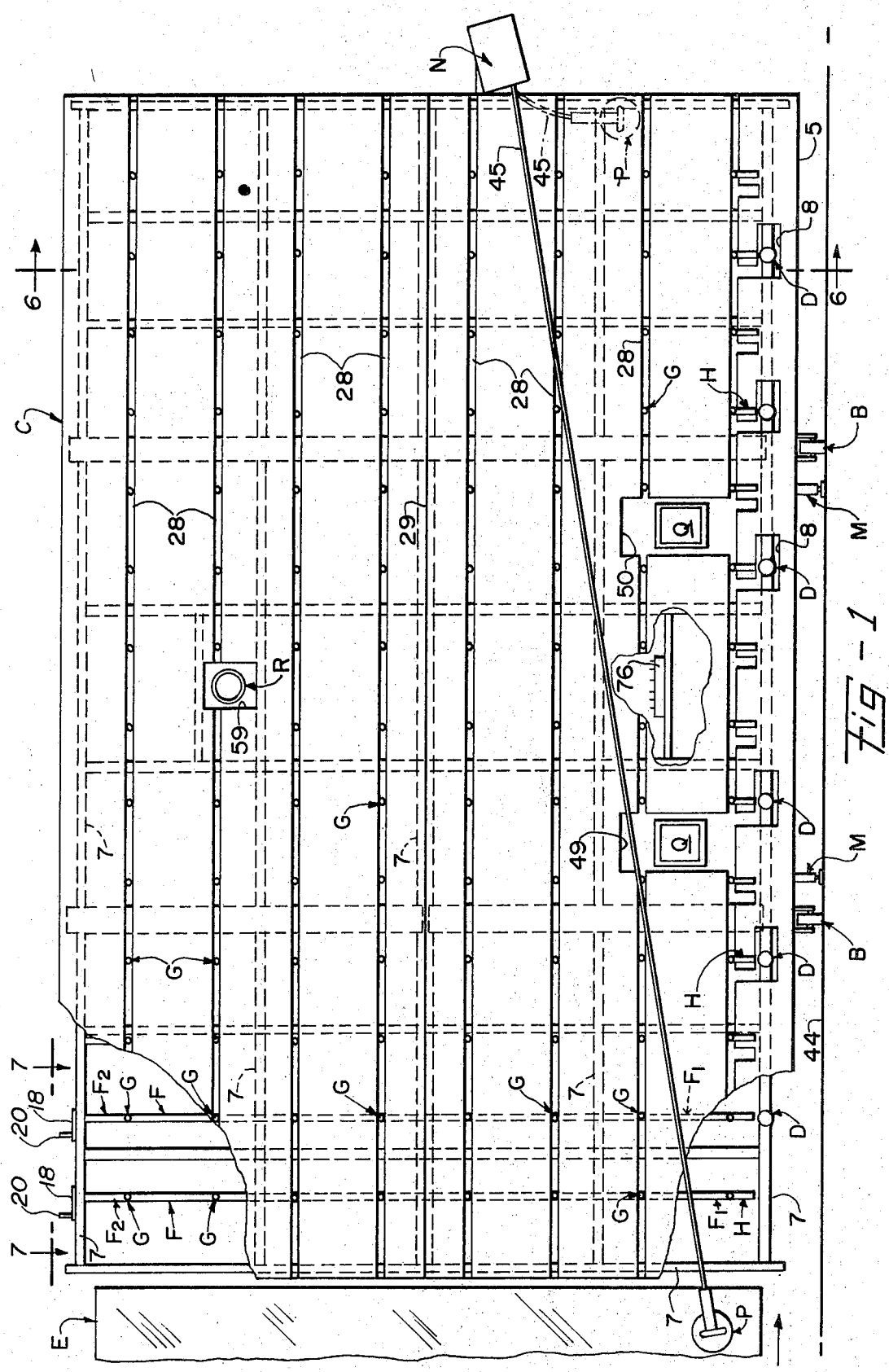

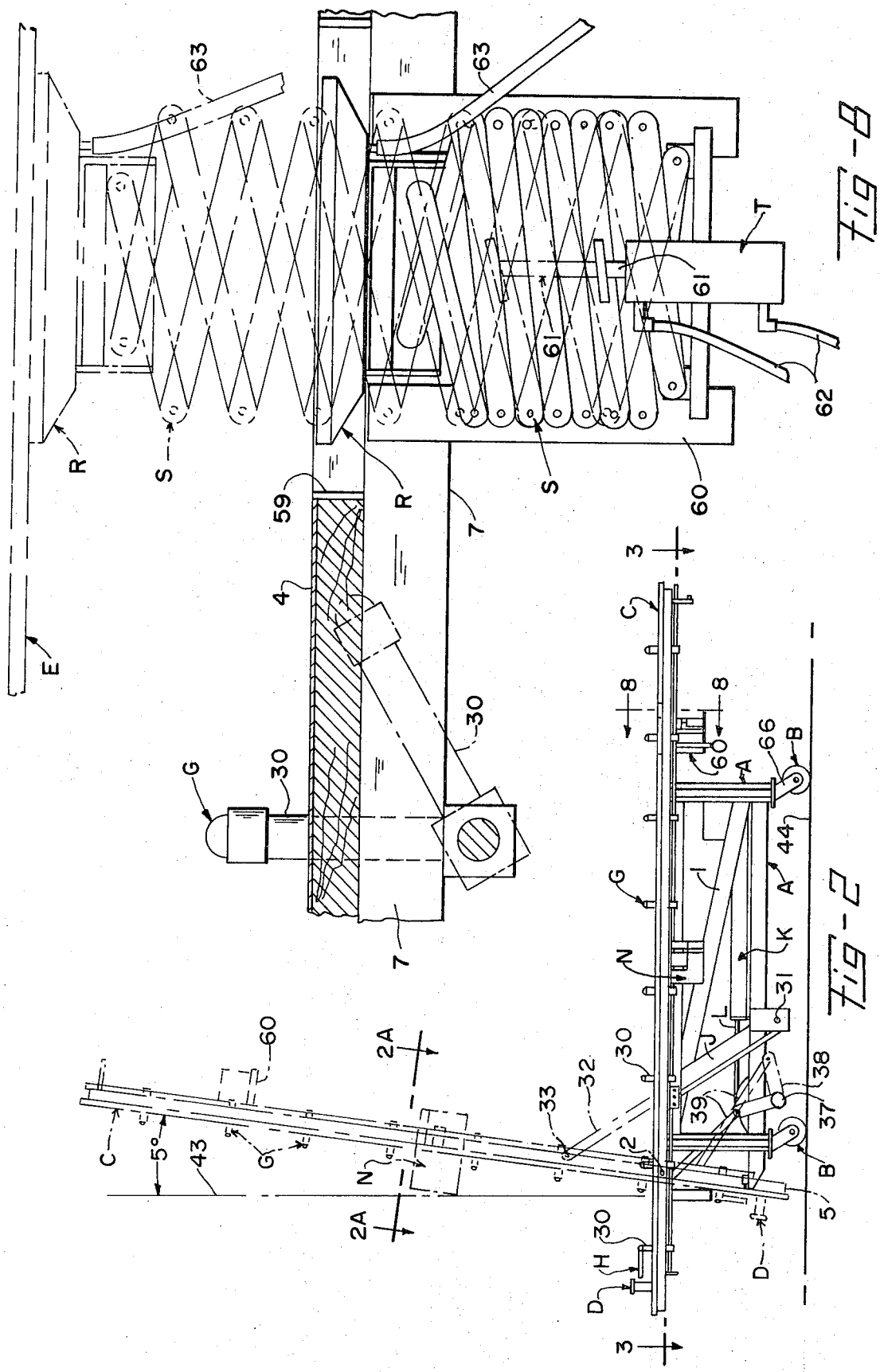

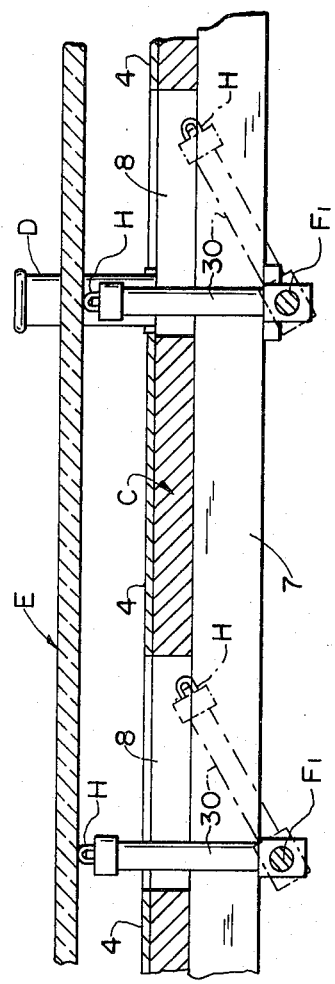
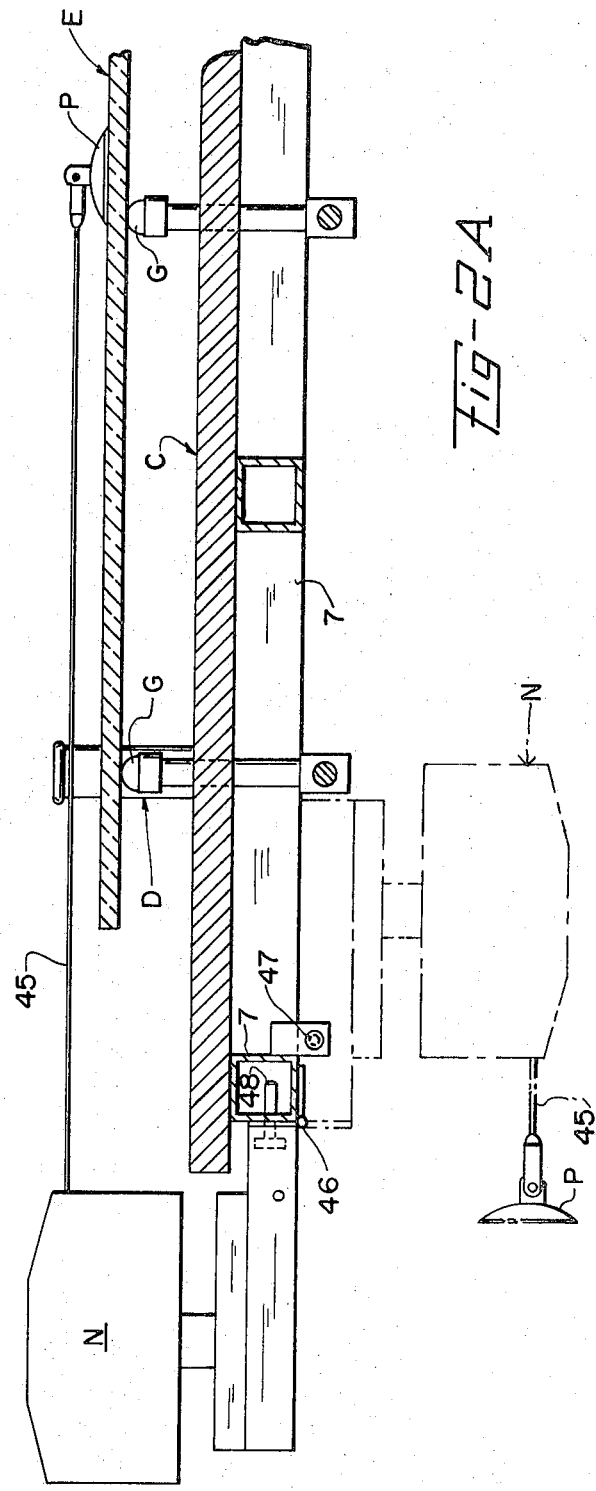

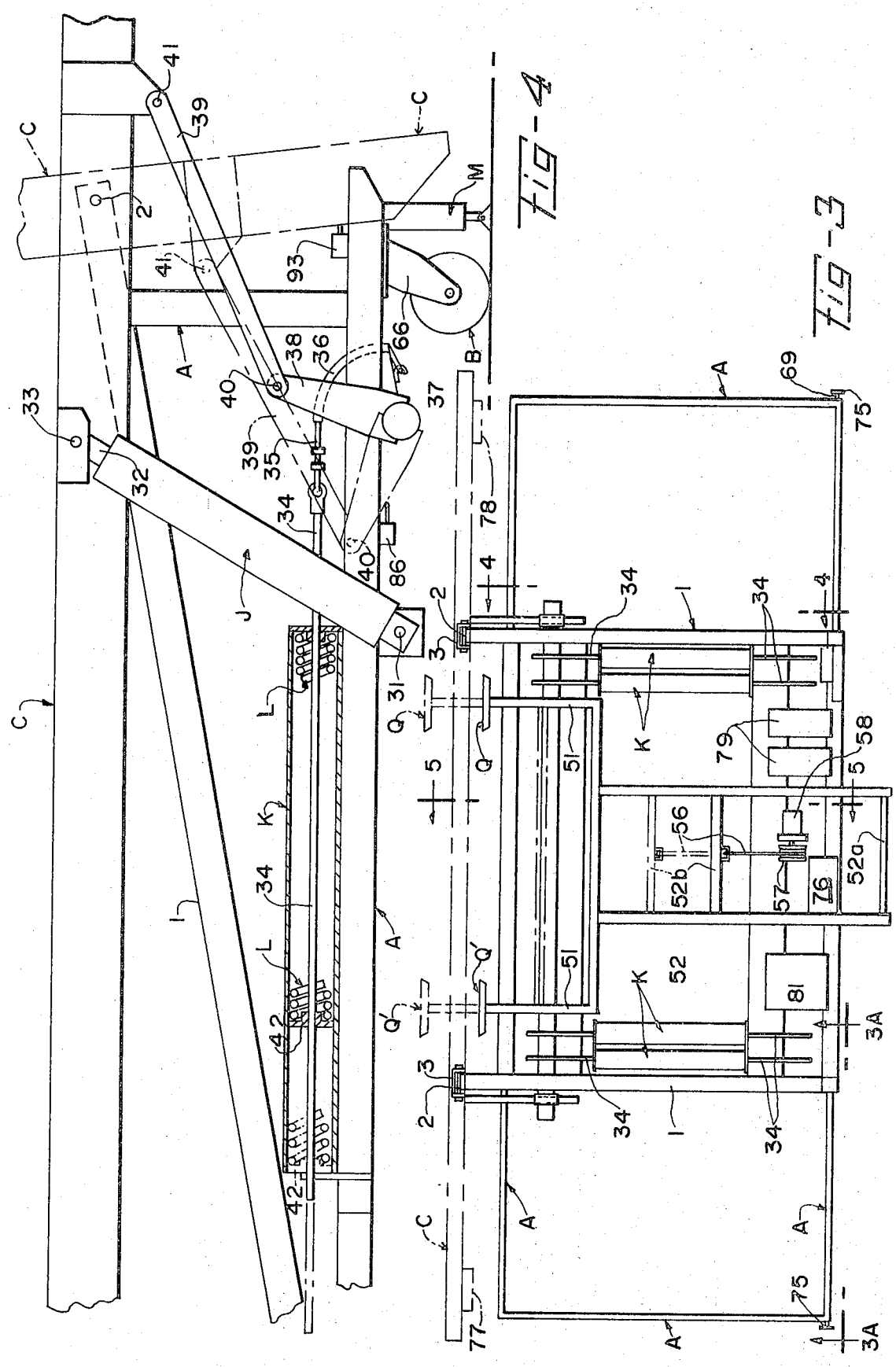

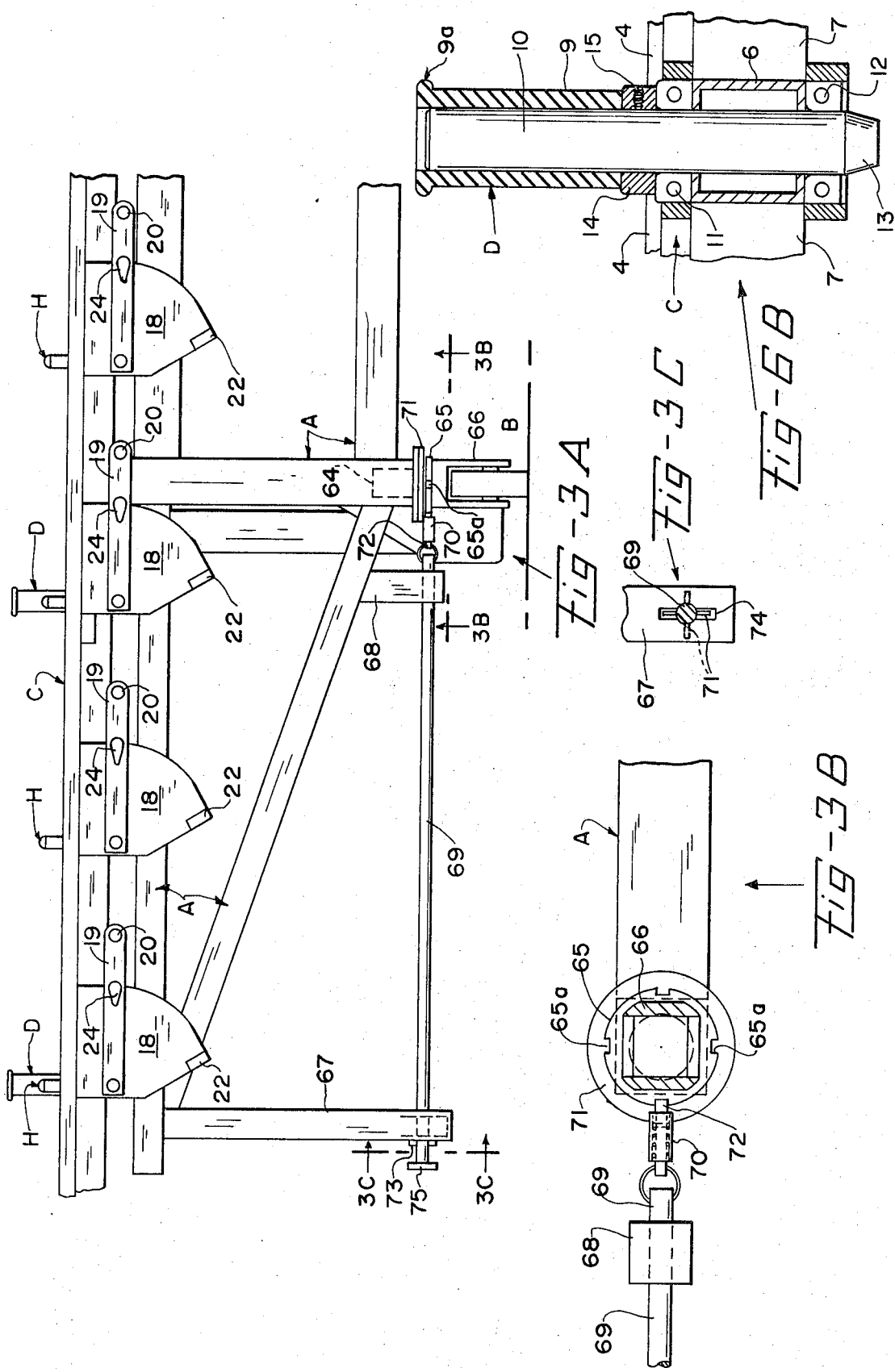

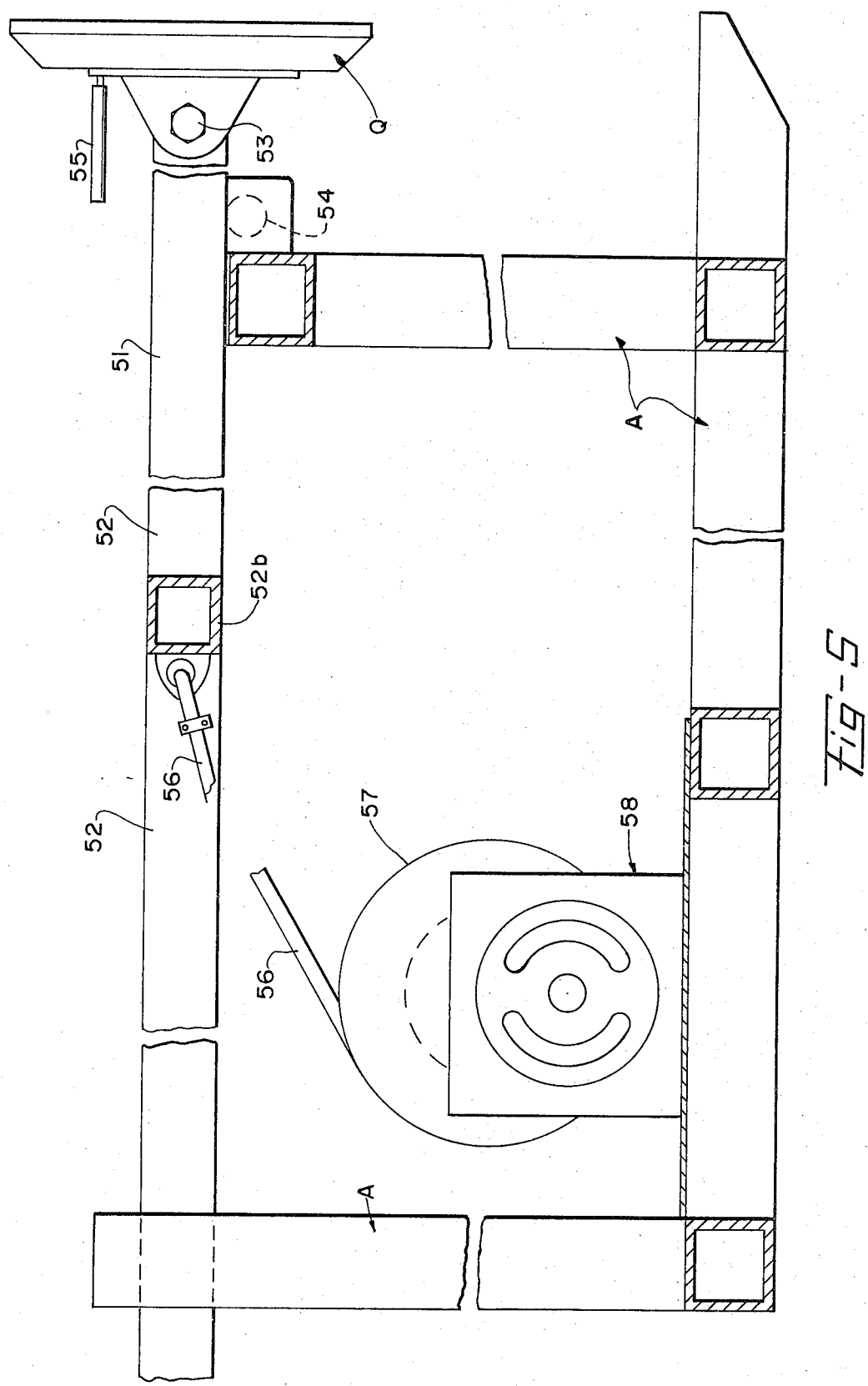

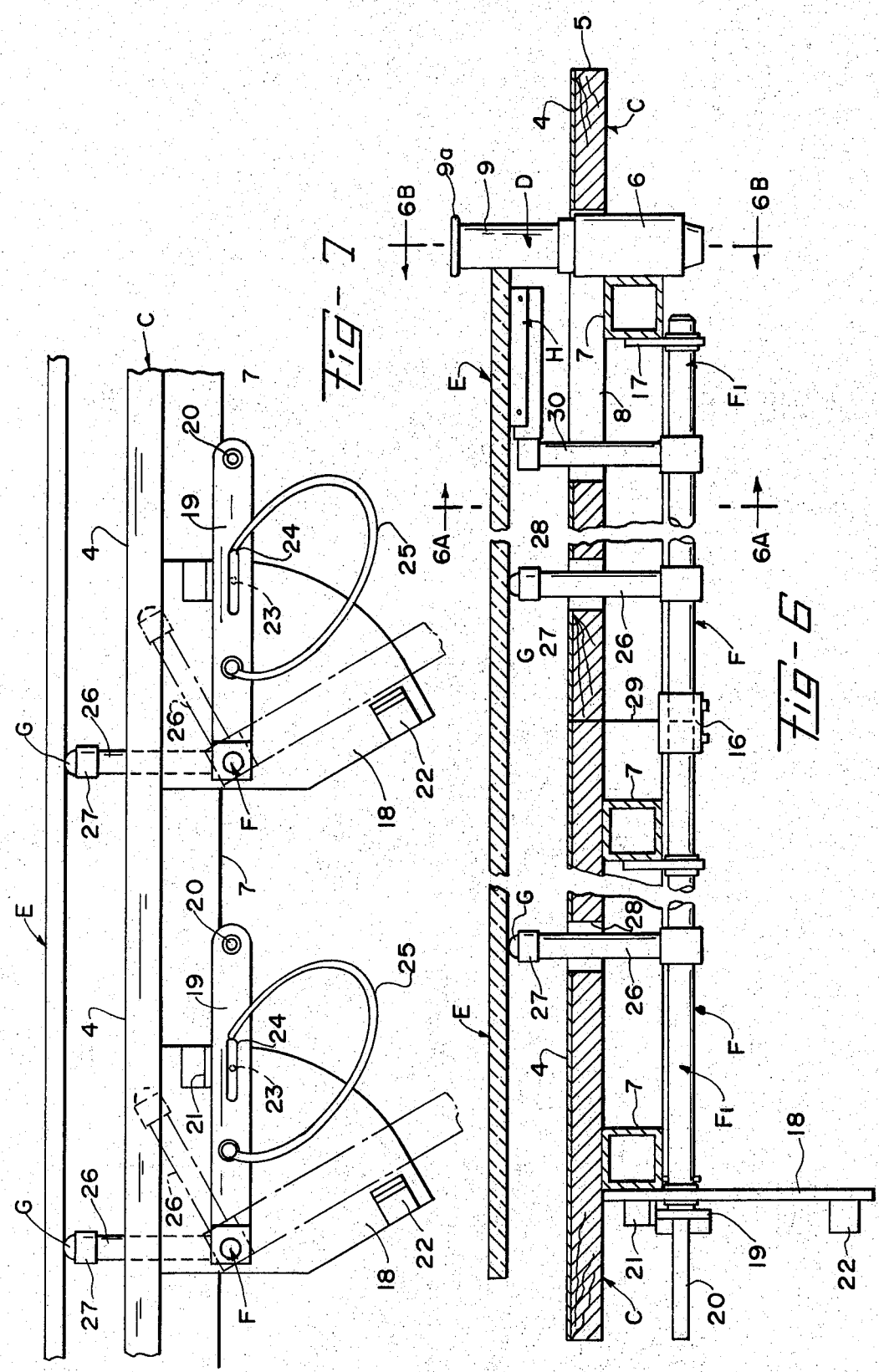

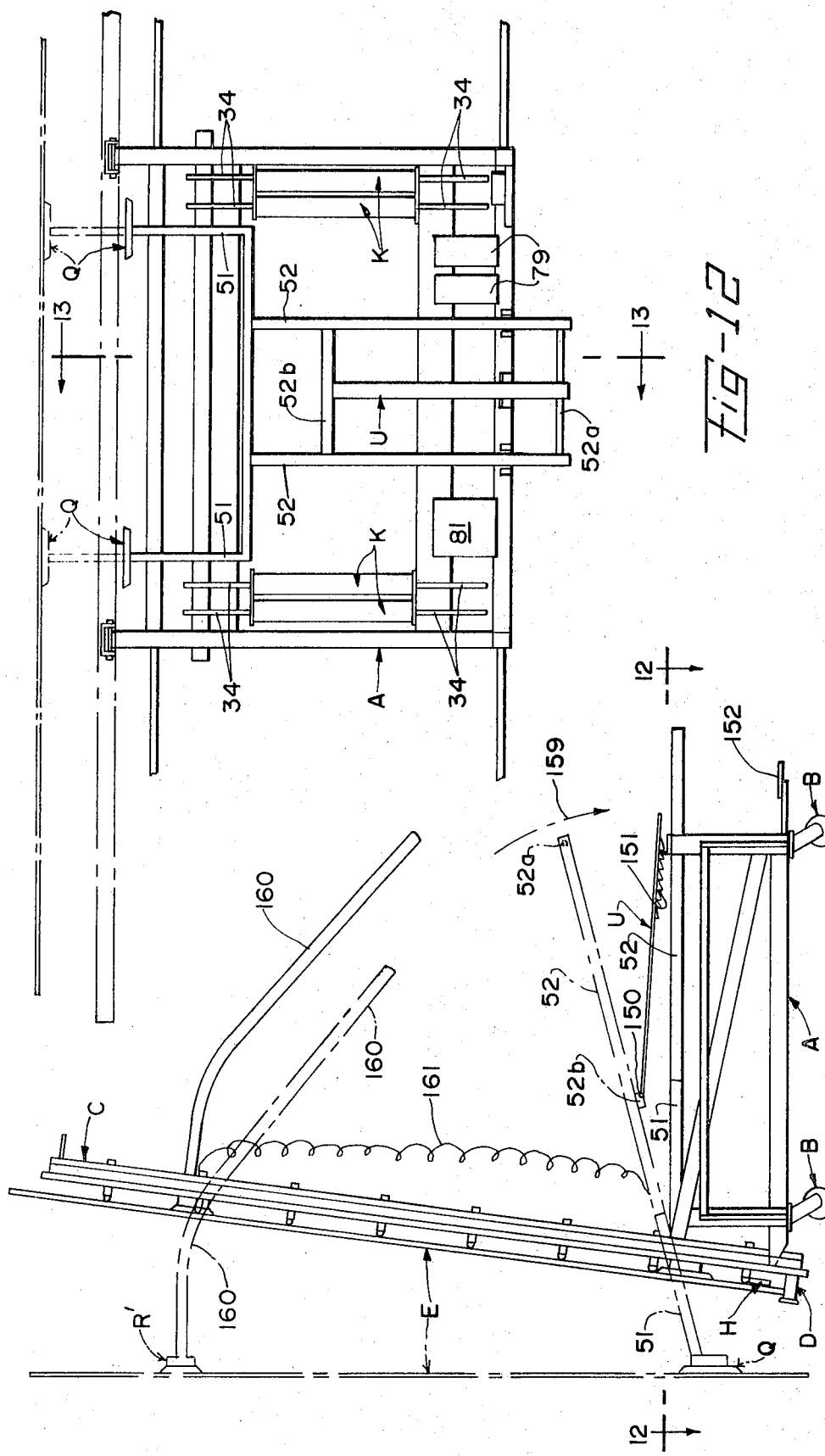

TILTABLE GLASS CUTTING TABLE

CROSS-REFERENCE TO RELATED APPLICATION

In a copending application on a Portable One Man Operated Large Sheet Glass Cutting Table, Ser. No. 306,720, filed Nov. 15, 19, 1972, I disclose a portable frame with a tiltable table top that has rubber rollers disposed adjacent to the lower edge of the table top when the latter is in an upwardly inclined position. A winch is mounted at one side of the table and it has a cable with a vacuum cup that can be attached to a large glass sheet for pulling the glass sheet edgewise onto the rubber rollers of the table top.

BACKGROUND OF THE INVENTION

1. Field of the Invention

My tiltable glass cutting table is designed specifically for a single operator to handle large sheets of one-fourth inch thick glass with safety. Normally, it would require several men to manually handle a large sheet of glass. The table is movable over the floor and can be positioned adjacent to a case containing large flat glass sheets and then the table can be anchored against movement. An electric winch with a suction cup at the end of the cable is used for withdrawing a large glass sheet from an open end of the casing. If it is desired to lift a glass sheet from the open front of a casing, other suction cups are used for this purpose. These suction cups are advanced and retracted by power means that is controlled by the operator.

A modified form of my invention discloses manual means for moving the set of suction cups that are used for removing a flat glass sheet from the open front of a casing containing several sheets of glass.

2. Description of the Prior Art

The patent to Andre Schram, U.S. Pat. No. 3,051,331, discloses a device for handling sheet material. A frame member is supported by steerable wheels and carries a horizontal bar adjacent to its lower end for receiving the lower edge of sheet material, such as glass. The top of the frame has a plurality of suction cups and either the frame is tilted forwardly on its front wheels to engage with a sheet of standing glass or the suction cups are moved into contact with the sheet for lifting the latter for transferring the sheet to the frame. The device then can transport the sheet to a desired location and then unload the glass sheet.

The patent does not disclose a tiltable glass cutting table. No means is disclosed in the patent for swinging the glass sheet from a practical vertical position into a horizontal position for purposes of cutting the glass.

SUMMARY OF THE INVENTION

An object of my invention is to provide a tiltable glass cutting table in which the table top can be swung from a horizontal position into a substantially vertical position. Power operated means is used for this purpose and it will automatically bring the table top to a stop in a fully raised or a fully lowered position, as well as slowing the movement of the table top as it nears either end of its swing. The swinging of the table top can be stopped in any position. The power source is preferably battery operated so that long electric cables are not necessary to connect to an electric outlet.

My tiltable glass cutting table is completely mobile in a plant and is supported by four swivel casters that may be locked in any one of a plurality of positions. In addition, automatic floor locks are used that will come into play before the table top can be tilted. The table top serves the dual purpose of providing a mobile unit that can move large sheets of glass from storage and the table top itself then becomes a cutting table for cutting the large sheet into smaller pieces. It is a complete one-man operation and the operator never has to touch the large sheet while it is being pulled or lifted from the case and transferred onto the table top. Sheets of flat glass may be either lifted out from the front of a case of glass and placed on the table top or the glass sheet may be pulled onto the table from an open end of the case. Retractable rubber rollers are arranged along the edge of the table top that becomes the lower edge when the table top is tilted into a substantially vertical position and these rollers support the lower edge of the large flat glass sheet as the glass is pulled from the open end of the case.

A revolutionary simple method and apparatus is used for breaking cuts in the flat glass and these cuts may extend in any direction along the glass, even diagonally. I provide a plurality of Nylon balls and mount these so that they normally extend a predetermined distance above the table top. These balls will support the flat glass and permit the operator to move the glass relative to the table top. The balls can be lowered below the table top when it is desired to lower the glass sheet onto the table top prior to cutting small pieces of glass which are placed manually onto the table top.

BRIEF DESCRIPTION OF THE DRAWINGS

FIG. 1 is a front elevation of my device and shows the tiltable table top in raised position. A portion of the table top is cut away to show how the sheet glass supporting balls are mounted.

FIG. 2 is an end view of my device when looking from the right hand side of FIG. 1. The table top is shown in its raised position by dot-dash lines.

FIG. 2A is an enlarged transverse section taken along the line 2A—2A of FIG. 2.

FIG. 3 is a top plan view of the frame that supports the table top and illustrates the mechanism for retracting the lower vacuum cups after they have engaged with a glass sheet.

FIG. 3A is an enlarged front elevation of a portion of the table when looking in the direction of the arrows 3A—3A in FIG. 3, and illustrates how the caster wheels can be locked against free rotation about their vertical axes.

FIG. 3B is an enlarged horizontal section taken along the line 3B—3B of FIG. 3A for showing the detailed mechanism that secures the caster roller from rotating about its vertical axis.

FIG. 3C is an enlarged vertical transverse section taken along the line 3C—3C of FIG. 3A and shows a part of the caster wheel locking mechanism.

FIG. 4 is an enlarged transverse section through the device and it is taken along the line 4—4 of FIG. 3. FIG. 4 shows the hydraulic mechanism for swinging the table top from a horizontal position into an almost vertical position, see the dot-dash line position of the tilted table top.

FIG. 5 is an enlarged transverse section through the frame that supports the tiltable table top and shows the mechanism for retracting the lower vacuum cups after they have engaged with a large glass sheet.

FIG. 6 is an enlarged transverse section through the tiltable table top and is taken along the line 6—6 of FIG. 1. The table top is shown in a horizontal position and the spherical balls are supporting a large sheet of glass whose right hand edge contacts the rubber rollers prior to their being retracted.

FIG. 6A is a transverse section taken along the line 6A—6A of FIG. 6.

FIG. 6B is an enlarged transverse section taken along the line 6B—6B of FIG. 6, and illustrates one of the sheet glass supporting rubber rollers.

FIG. 7 is an end view of the table top when looking in the direction of the arrows 7—7 in FIG. 1. The spherical balls for supporting the glass sheet above the table top are shown swung into inoperative position by the dot-dash lines.

FIG 8 is an enlarged transverse section through the table top and is taken along the line 8—8 of FIG. 2 and shows the mechanism for advancing and retracting the upper vacuum cup.

FIG. 11 is an end view of a modified form of my invention wherein the two lower vacuum cups are manually movable from inoperative position into operative position and wherein the upper vacuum cup is manually movable into operative position.

FIG. 12 is a top plan view of the table top supporting frame and is taken along the line 12—12 of FIG. 11. The upwardly inclined table top is illustrated by dot-dash lines.

DESCRIPTION OF THE PREFERRED EMBODIMENTS

Figure 9:
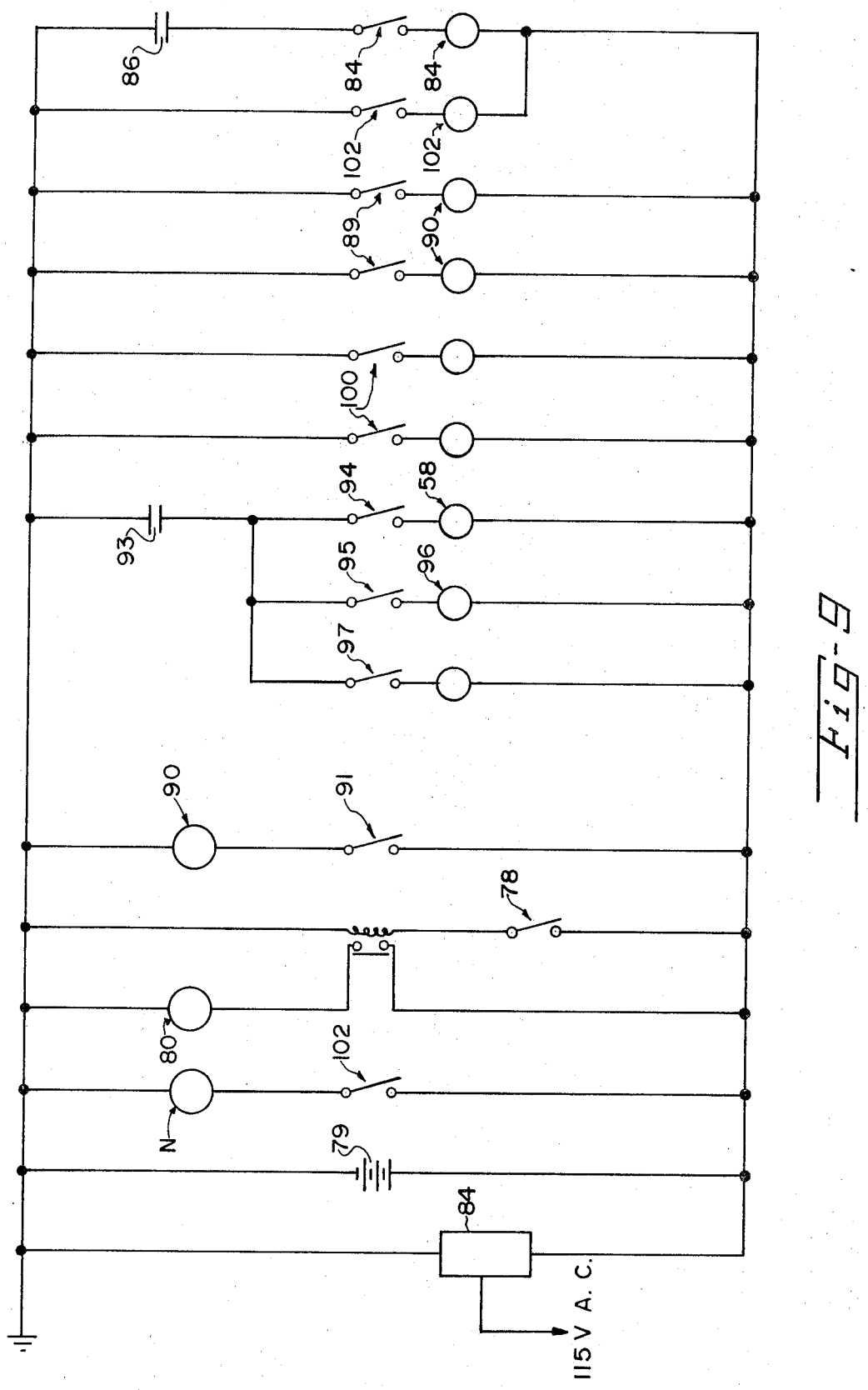
FIG. 9 is a wiring diagram for the tiltable glass cutting table.

In carrying out my invention I provide a rectangular frame A that is movably supported by four caster wheels B, see the plan view of the frame in FIG. 3, with the tiltable table top removed in this Figure, and see an end view of the frame in FIG. 2 showing the table top C in a horizontal position in full lines and in an upwardly inclined position by dot-dash lines. See also FIG. 1 showing a front elevation of the device with the table top raised. The frame A has a pair of inclined table top supporting members 1 that have their front ends pivotally secured by bolts 2 to channels 3 forming a part of the structure for the table top C, see FIGS. 2, 3 and 4.

The table top C is shown in detail in FIG. 1, where the table top is in its upwardly slightly inclined position where it is ready to receive a large flat sheet of glass or other flat sheet material. The table top is rectangular in shape. The table top may be covered with a layer of felt 4, as indicated in an enlarged transverse section shown in FIG. 6, where the table top is shown in a horizontal position. The right hand end 5 of the table top C, seen in FIG. 6, becomes the lower end when the table top is in its upwardly inclined position, as shown in FIGS. 1 and 2. A plurality of rubber rollers D are arranged near the lower edge 5 of the table top C and these are for the purpose of supporting the lower edge of a sheet of glass E in a manner hereinafter described.

In FIG. 6, I show one of the rubber rollers D in elevation and in FIG. 6B, I show a longitudinal section through the roller. A sleeve 6 is welded or otherwise secured to the frame 7 that supports the table top C. The sleeve extends through an opening 8 provided in the table top. The rubber roller D consists of a rubber sleeve 9 mounted on a shank 10 that extends downwardly through the sleeve 6, as clearly shown in FIG. 6B. The rubber sleeve 9 has an annular rib 9a at its outer end for preventing the glass sheet E from accidentally dropping off from the roller when the table top is in an upwardly inclined position and is supporting the glass sheet.

Again referring to FIG. 6B, it will be seen that the lower portion of the shank 10 for the roller D is rotatably received in the sleeve 6 and ball bearing races 11 and 12, mounted at each end of the sleeve 6, rotatably support the shank 10. The lower end of the shank 10 has a tapered portion 13 that permits the shank to be manually inserted into the ball bearing races 11 and 12. A collar 14 is slipped over the shank 10 and is held in place by a set screw 15. The collar 14 acts as a stop for limiting the downward movement of the shank 10 into the sleeve 6 when the rubber roller D is mounted into position in the sleeve. The rubber roller D can be manually removed from its sleeve 6 as will be hereinafter explained. A number of these rubber rollers D are arranged along the lower edge 5 of the table top C and each one can be manually removed from its supporting sleeve 6 or reinserted in place.

I will now describe how the sheet of glass E is supported by a plurality of spherical balls that are mounted in spaced relation over the entire top of the table top C so as to space the sheet glass above the table top and permit the glass to be moved relatively to the table top. In FIGS. 1, 6 and 7, I show a plurality if spaced apart and parallelly arranged rods F that extend transversely across the table top C, and on the underside thereof. One of the rods F is illustrated in an enlarged view in FIG. 6, and this rod is shown in two lengths F1 and F2, with the inner ends of the two sections held in an abutting relation by a sleeve 16. The rod length F1 has its outer end rockably mounted in a bracket 17 that is attached to the frame 7 that supports the tiltable table top C. The other rod length F2 has its outer end rockably monted in a quadrant-shaped bracket 18, see FIGS. 6 and 7. An arm 19 has one end rigidly connected to the end of the rod length F2 that extends through the quadrant bracket 18 and this arm extends radially from the rod and is provided with a handle 20 at its outer end. The arm 19 can be swung between two spaced apart stops 21 and 22 that are mounted on the quadrant bracket 18. The arm 19 is shown in operative position by full lines in FIG. 7 and in inoperative position by dot-dash lines. The arm 19 is secured in its operative position by a pin 23 that is provided with a hand grip 24 and the operator can insert the pin 23 in aligned openings provided in the arm 19 and the quadrant bracket 18. A cord 25 has one end connected to the arm 19 and its other end connected to the hand grip 24 so that the hand grip cannot become misplaced.

The purpose for swinging the rods F from operative to inoperative position and vise versa is to swing radially extending supports 26 with their spherical freely revolving balls G, from operative into inoperative position, the supports 26 being rigidly connected to the rockable rods F, see FIGS. 6 and 7. The balls G revolve freely in cups 27 that are mounted on the outer ends of the supports 26 that extend radially from the rods F. It will be noted from FIG. 1 that the spherical balls G on the rods F are spaced apart so that the radially extending supports 26 for the balls will be received in slots 28 that extend throughout the length of the table top C and are arranged in spaced apart and parallel relation. FIG. 7 illustrates two of the spherical balls G supporting the glass sheet E a spaced distance above the surface of the table top C when the glass supporting balls are in operative position. The sheet of glass E may be large in area, such as 11 feet by 20 feet, and it is imperative that the glass be supported in a number of places by the balls G and it is for this reason that the supports 26 for the balls and the rods F are locked against accidental movement by the pins 23 being inserted in the aligned openings in the arms 19 and the quadrant brackets 18. The parallel slots 28 in the table top C, see FIG. 1, permit the balls G and their supports 26 to be swung into an inoperative position, as shown in FIG. 7. The table top C is very large in area and it is for this reason that it is formed in two equal halves divided along the line 28 in FIGS. 1 and 6. The two halves of the table top may be secured together in any manner desired.

It should be noted from FIG. 6 that I provide sheet glass positioning members H and these are arranged adjacent to the rubber rollers D. The members H are supported by arms 30 and these arms are connected to the rod lengths F1 and extend radially therefrom. The openings 8 in the table top C are made large enough in area to permit the sheet glass positioning members H to be swung into an inoperative position when the rods F are rocked for swinging the balls G into an inoperative position. FIG 6A is a longitudinal section taken along the line 6A—6A of FIG. 6 and shows two of the sheet glass positioning members H supported by their arms 30 that extend radially from the rod lengths F1. The sheet of glass E is resting against the positioning members H and the lower edge of the glass contacts with the rubber rollers D. There may be as many positioning members H as there are rubber rollers D. FIG. 6A further shows the positioning members H swung into an inoperative position illustrated by the dot-dash lines of the arm supports 30, the rollers passing into the openings 8 in the tiltable table top C, and being disposed below the upper surface of the table top. It will be seen from this construction that the table top C can have the sheet glass supporting spherical balls G and the glass positioning members H disposed above the table top or moved below the table top. Also, the rubber rollers D can be removed when a clear table top is desired.

I will now describe the means for swinging the table top C into an upwardly inclined position. In FIGS. 2 and 4 I show a pair of hydraulic cylinders J that have their lower ends povoted to the frame A at 31. The cylinders contain pistons, not shown, that act on piston rods 32 which have their outer ends pivotally connected at 33 to the table top C. The table top when in a horizontal position is supported by the frame A and it is pivotally connected at 2 to the upwardly inclined support members 1. When hydraulic fluid under pressure is fed to the lower ends of the cylinders J, in a manner hereinafter described, the pistons and piston rods 32 will swing the table top C upwardly, the table top swinging about the pivots 2.

The weight of the table top C is counterbalanced by a mechanism shown in detail in FIG. 4 and shown in plan view on a smaller scale in FIG. 3. Two pairs of coil springs are housed in two pairs of cylinders K. One of the coil spring housings K is shown in section in FIG. 4 and the coil spring L is mounted within the housing. The housings K are secured to the frame A and a rod 34 is slidably mounted in each housing and extends along the axial center of the coil spring L. A cable 35 has one end connected to the forward end of the rod 34 and the cable is passed around a quadrant 36 and has its other end secured to the quadrant, the quadrant being keyed to a rockable shaft 37 that is carried by the frame A. An arm 38 is also keyed to the same shaft 37 and a link 39 has one end pivotally connected at 40 to the outer end of the arm 38 and the other end of the link 39 is pivotally connected to the tiltable table top C at 41. FIG. 4 shows the coil spring L with one end bearing against the closed end of the cylinder housing K and the other end of the spring bears against a disc 42 that is secured to the rod 34 and slides in the housing K. The four heavy duty springs L counterbalance the weight of the tiltable table top as the hydraulic cylinders J and their piston rods 32 swing the table top from a horizontal position when resting on the frame A into almost a vertical position, as shown by the dot-dash lines in FIG. 2. Novel means, hereinafter explained, will slow down the movement of the table top C as it nears its almost upright position and the swinging table top will be brought to a stop when the surface of the table top is inclined substantially at an arc of 5° from a vertical line 43, shown in FIG. 2. The weight of the table top C, when in an almost vertical position, will aid the top when being swung back into a horizontal position so as to rest on the frame A. Also, the coil springs L will substantially counterbalance the weight during the swinging of the table top.

When the table top is in its substantially vertical position, except for its 5° tilt from the vertical as shown in FIG. 2, the table top can receive a large flat sheet of glass or other material and the sheet can be pulled edgewise from a container, not shown, but a portion of the glass sheet E is shown in FIG. 1, and disposed just to the left of the upwardly inclined table top. The spherical balls G for supporting the glass sheet are in operative position so as to extend above the table top surface. The rubber rollers D are also in position and the sheet glass positioning members H are in operative position.

The operator carefully aligns the raised table top C with the glass sheet C that is to be removed edgewise from the open end of the casing, not shown, that contains the glass sheets. A single operator can move the frame A into proper position on its caster wheels B and then the hydraulic floor locks M can be moved into engagement with the floor 44 for preventing further movement of the frame A, as will be described hereinafter. Also, the caster wheels B can be locked against rotating on their vertical axes, if desired, as will be explained later. The single operator now uses an electric winch N and cable 45 and a standard vacuum cup P secured to the free end of the cable.

The safety of the single operator is of vital consideration at all times and for this reason I show in FIG. 2A how the electric winch N is mounted at the side edge of the table top C and FIG. 1 shows how the winch is disposed at the opposite side from which the sheet glass E is pulled from its casing, not shown. After the operator positions the table top C in proper relation to the sheet of glass to be pulled from the casing, he can attach the standard vacuum cup P to the glass. This is accomplished by removing the end board from the case and cutting a small section out from the side of the case where the suction cup is to be attached to the glass sheet in the case.

In FIG. 2A, I show how the winch N is mounted on a hinge 46 secured to the frame 7 of the table top C, and the operator can swing the winch from the inoperative position, indicated by the dot-dash lines where the winch is disposed in back of the table top, into operative position shown by the full lines where the winch is positioned in front of the table top. A locking pin 47 secures the electric winch N in inoperative position and another locking pin 48 secures the winch in operative position. Any other type of locking means may be used for securing the winch in either of its two positions.

FIG. 1 illustrates the cable 45 being pulled from the winch N and stretches across the front of the upwardly inclined table top C and the operator has attached the vacuum cup P to the side of the sheet of glass E. The lower edge of the glass sheet will be disposed in line with the rubber rollers D. The operator now closes the switch to the winch N and the winch reel, not shown, will start winding up the cable 45 and pull on the vacuum cup P for causing the latter to pull the sheet glass E onto the rubber rollers D that are free to rotate. It has already been mentioned that the tilted table top C is inclined about 5° from the vertical and the pull of the cable 45 on the glass sheet will cause it to rest against the glass positioning members H and to also rest against the spherical balls G. FIG. 2A illustrates the glass sheet E resting on the rubber rollers D and leaning against the spherical balls G. During this operation the operator stands in a safe position at the side edge of the table top C fartherest removed from the glass sheet. As the glass sheet is pulled from its casing, not shown, the operator may temporarily stop the operation of the winch N and reattach the vacuum cup P at a new position on the glass sheet so that the pull on the glass will be more in the direction of the length of the sheet and very little vertical pull.

Before describing the operation of the table top C any further at this time, it is best to set forth how the table top is provided with additional suction cups for removing a large sheet of glass from the front of a casing, not shown, where the casing cover has been removed and exposing the large glass sheet. In FIG. 1, I show the upwardly tilted table top provided with two openings 49 and 50 arranged near the rubber rollers D. Then in FIG. 3, I show the vacuum cups Q and Q' mounted on a U-shaped rocker arm 51 that has a rearwardly extending portion 52 that overlies the top of the frame A. The vacuum cups Q and Q' can be moved through the openings 49 and 50, when the table top C is in raised position and the operator moves the arm 51-52 forward that carries these cups. In this manner the lower vacuum cups Q and Q' can be brought into engagement with the glass sheet E in the case, not shown, when the device has been first moved into proper position in front of the case and the hydraulic floor locks M have been moved into floor-engaging position.

FIG. 5 shows an enlarged transverse section through the U-shaped rocker arm 51 and its rearwardly extending portion 52, and it will be seen that the vacuum cup Q' in this Figure is pivotally connected at 53 to the arm 51. The vacuum cup Q is likewise pivotally connected to the arm. The frame A carries a pair of rollers 54, only one being shown in FIG. 5, and the parallel portions of the U-shaped rocker arm 51 ride and fulcrum on these rollers. The operator may grasp the rear cross piece 52a, see FIG. 3, of the rear arm portion 52 and manually move the arm and its two vacuum cups Q and Q' forwardly until the cups contact the face of the glass sheet E. The operator raises the rear end of the arm 52 as he moves the U-shaped portion 51 forwardly so as to cause the vacuum cups Q and Q' to engage with the glass sheet near the lower edge of the sheet. Then when the operator starts to retract the arm 52 he can move the rear end of the arm downwardly and thereby raise the vacuum cups Q and Q' upwardly so as to lift the glass sheet E and cause its lower edge to be moved slightly above the rubber rollers D. A vacuum is applied to the vacuum cups Q and Q' during this movement of the glass by the vacuum lines 55. The openings 49 and 50 in the table top C are made large enough to permit the vertical movement of the vacuum cups Q and Q' in these openings as the operator fulcrums the arm 52 on the rollers 54 until the glass sheet E has had its lower edge moved so as to rest on the rubber rollers D and against the positioning members H, see FIG. 6.

It will be remembered that a single operator can accomplish the transferring of the lower portion of the glass sheet E from the open front of the casing, not shown, onto the rubber rollers D. I have provided power means for retracting the arm 52 should the weight of the large glass sheet E be too heavy to handle for the one operator. In FIGS. 3 and 5, I show the U-shaped arm 51 with its rearwardly extending portion 52 provided with a cross piece 52b to which a cable 56 is connected. The cable is wound around a drum 57 that is rotated by an electric motor 58. The operator can close a switch to the motor for causing the latter through a proper gear reduction to rotate the drum 57 at a very slow speed so as to pull the U-shaped arm 51 rearwardly while the vacuum cups Q and Q' are attached to the glass. The operator is free to manipulate the rear cross piece 52a of the arm 51 to fulcrum the arm on the rollers 54 during this slow rearward movement so as to lift the lower portion of the glass sheet E from its casing and place the lower glass edge on the rollers D and against the positioning members H while the top of the glass sheet still remains in the casing, not shown. The switch for the motor 58 is opened as soon as the glass sheet E has its lower edge disposed above the rollers D. The tremendous leverage afforded to the operator on the U-shaped arm 51 by placing the supporting and fulcrumming rollers 54 adjacent to the vacuum cups Q and Q' and by providing the relatively long rearwardly extending portion 52, permits a single operator to lift the large glass sheet. It should also be noted that during this entire operation the operator stands in back of the frame A and in back of the upwardly tilted table top C so that at no time can the operator be endangered should anything happen to the glass sheet E.

I will now describe how the upper portion of the glass sheet, which is still in the case, can be engaged by another vacuum cup and pulled toward the upwardly inclined table top C. In FIG. 1, I show the upwardly inclined table top C provided with a central opening 59 which is disposed in the upper portion of the table top.

Another vacuum cup R is disposed adjacent to the opening 59 and it is mounted on a lazy-tong apparatus S so that an extension of the lazy-tong will move the vacuum cup through the opening 59 and into engagement with the upper portion of the glass sheet E, as illustrated by the dot-dash line position of the vacuum cup and lazy-tong in the enlarged sectional view of FIG. 8, which is taken along the line 8—8 of FIG. 2.

The enlarged detail of FIG. 8 shows the lazy-tong S mounted on a platform 60 that in turn is secured to the frame 7 of the tiltable table top C. The lazy-tong supports the vacuum cup R in registration with the opening 59 so that when the lazy-tong is extended, it will move the vacuum cup through the opening as indicated by the dot-dash lines in FIG. 8. The lazy-tong S may be elongated by any means desired and I have shown a hydraulic cylinder T with its piston rod 61 connected to the lazy-tong so that when hydraulic fluid under pressure is fed into the cylinder, the piston rod 61 will advance and elongate the lazy-tong for moving the vacuum cup R into the dot-dash line position. Hydraulic lines 62 are connected to each end of the cylinder T for moving the lazy tong S into extended or retracted position. Also, a vacuum line 63 communicates with the vacuum cup R for placing a vacuum on the cup for causing it to adhere to the glass sheet E when the vacuum cup has been moved into contact with the glass by the elongation of the lazy-tong. When describing the complete operation of the device, I will explain how the upper vacuum cup R can be moved into contact with the upper portion of the glass sheet E and pull the glass over onto the upwardly inclined table top C where the glass sheet will contact the spherical balls G.

It is best now to describe how the caster wheels B can be locked from rotating about their vertical axes, see FIGS. 3A, 3B and 3C. The caster wheel shown in FIG. 3A has a shank 64 that is received in one of the uprights forming a part of the frame A. The caster wheel normally is free to rotate about the vertical axis of the shank and a disc 65 is rigidly secured to the yoke 66 that supports the wheel B. This disc 65 will rotate with the yoke 66 as the caster wheel is free to rotate about its vertical axis. FIG. 3B shows the disc 65 provided with a plurality of notches 65a.

In FIG. 3A, I show a pair of depending extensions 67 and 68 connected to the frame A and a horizontally disposed rod 69 is slidably carried by these extensions. A sleeve 70 is welded or otherwise secured to a non-rotating disc 71 and the axis of the sleeve is in alignment with the axis of the rod 69. A spring pressed plunger 72 extends through the sleeve 70 and the plunger may be received in one of the notches 65a for preventing rotation of the disc 65 and the yoke 66. FIGS. 3A and 3C show the rod 69 connected to the plunger 72 and the rod is provided with a transversely extending pin 73 that may be aligned with a slot 74 in the extension 67 when the rod is rotated on its axis by manually grasping a knob 75 and rotating it. When this takes place the pin 73 will move into the slot 74 and the spring pressed plunger 72 will enter one of the notches 65a and prevent rotation of the caster wheel B about its vertical axis. The caster wheel yoke 66 can be freed when the operator pulls on the knob 75 and causes the rod 69 to free the plunger 72 from its notch. The rod 68 can be held in retracted position by rotating the rod about 90° to swing the pin 73 into the dot-dash line position where the pin will be out of alignment with the slot 74. Each of the four caster wheels B is provided with a similar lock mechanism.

OPERATION

From the foregoing description of the various parts of the device, the operation thereof may be readily understood. I will first set forth the lifting of a glass sheet E from an open face case, not shown, onto the table top C. Reference will be made to the electrical diagram of FIG. 9 and to the schematic hydraulic diagram of FIG. 10.

The rubber rollers D are set in position and the spherical balls G are raised into operative position. The device is provided with three sets of electric switches. In FIG. 3, I show a panel 76 for switches and the panel is placed at the rear of the frame A and near the member 52 that controls the movement of the lower pair of vacuum cups Q and Q' so that the operator will have ready access to the switches on the panel. There are two additional panels of duplicate switches, one panel 77 of switches being disposed at the left hand end of the tiltable table top C and the other panel 78 of switches being disposed at the right hand end of the table top. This permits the operator to stand at either the left or the right hand side of the table top C and actuate the necessary switches.

Figure 10:
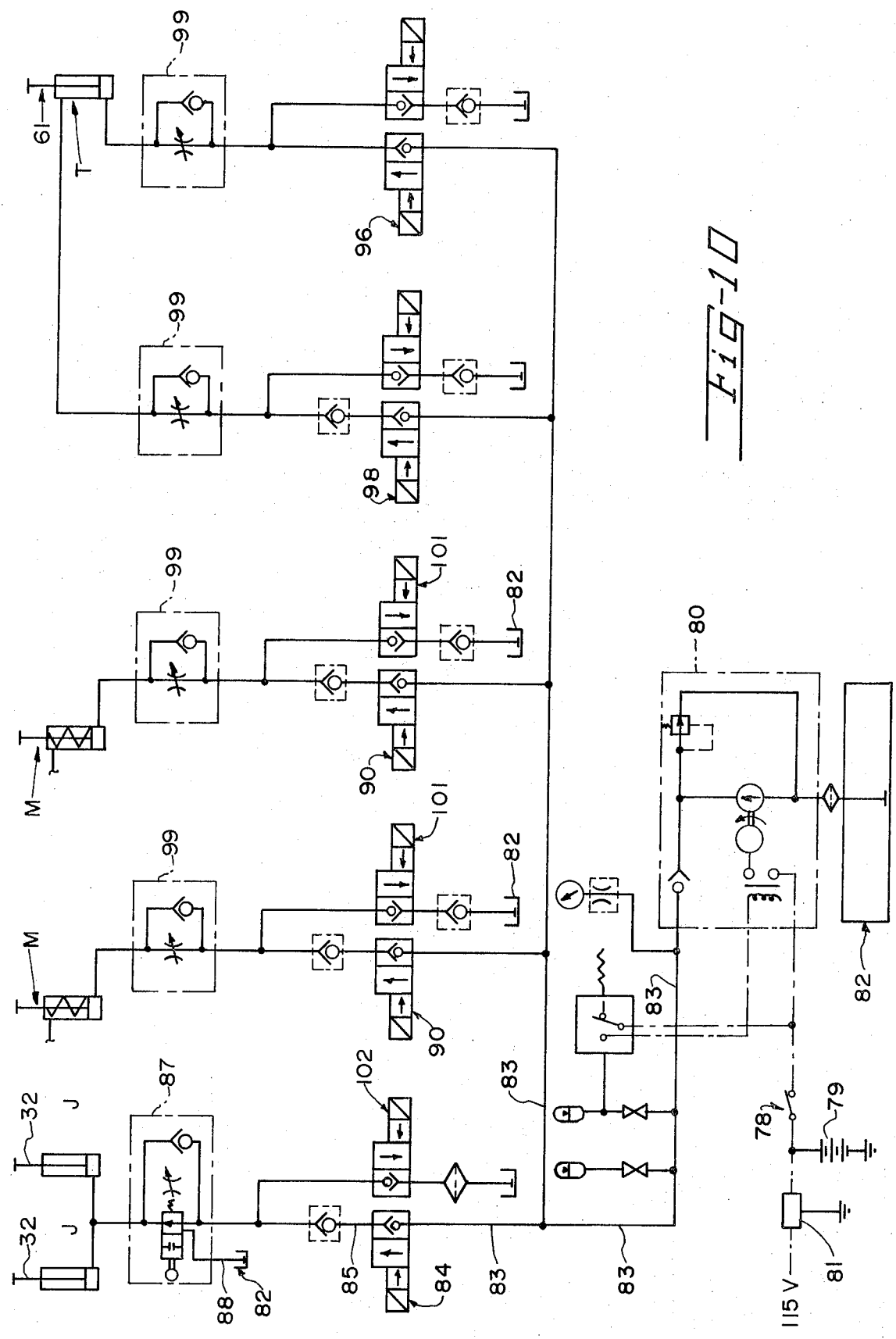
FIG. 10 is a schematic showing of the hydraulic mechanism for operating the glass cutting table.

The operator closes a starting switch 78 in the electrical portion of the schematic hydraulic system of FIG. 10 and this will close a circuit from a storage battery 79 to a hydraulic pump, indicated generally at 80. The battery 79 makes the device portable without needing a long cable to connect to an electric outlet of 220v. source. This permits the device to function all day and for the night the device may have its battery charger 81 connected to the current source for recharging the battery 79 so that the device can be operated from the battery for the following day. The pump 80 will take fluid from a tank or reservoir 81 and deliver it under pressure into a hydraulic line 83 and when an electric switch 84, see FIG. 9, is closed for raising the table top C into a substantially upright position, a solenoid valve 84 will be opened, see also FIG. 10, and the hydraulic fluid will flow through a line 85 to the hydraulic cylinders J—J for causing the piston rods 32 to swing the table top upwardly. FIG. 4 shows a deceleration switch 86 which may be placed in a position where it will be actuated as the table top C nears the top of its swing.

I have shown the switch 86 mounted on the frame A and actuated by the arm 38 in FIG. 4 as the arm nears the end of its swing during the latter swinging of the table top C into an almost vertical position. The switch 86 could be actuated by the swinging table top, if desired. The deceleration mechanism is indicated schematically at 87 in FIG. 10. Some of the fluid is bypassed back into a return line 88 that leads back to the reservoir 82 which is duplicated diagrammatically in FIG. 10, rather than show the line 88 extending to the tank 82 disposed near the pump 80 in this Figure.

The device is moved in front of the open face of the sheet glass containing casing, not shown, until the rubber rollers D touch the front of the casing. Both floor locks M are set, see FIGS. 9 and 10, by closing the floor lock switches 89 which close an electric circuit to the two solenoid valves 90 that control the hydraulic fluid flowing to the floor locks M for actuating them.

The vacuum creating switch 91 is now closed and will start the vacuum pump 92, see FIG. 9, for creating a vacuum in each of the three suction cups Q, Q' and R, see FIG. 1. The operator now lifts the rear cross member 52a and moves it forwardly for advancing the two lower suction cups Q and Q' into contact with the face of the glass sheet E that is in the casing. The drum 57 and the cable 56 will unwind to permit this movement and the fulcrum rollers 54 are such that an upward lift of about twelve inches on the cross member 52a will lower the suction cups Q and Q' about one to two inches so as to engage with the glass sheet near to its lower edge.

At this point, after the cups Q and Q' are engaged to the sheet of glass by vacuum, the cross member 52 is pushed downwardly by the operator causing the member 51 to fulcrum on its rollers and to raise the bottom edge of the glass sheet about 1 to 2 inches. This frees the bottom edge of the glass sheet from the case and allows the bottom portion of the glass to be pulled over to the sheet glass positioning members H, and onto the rubber rollers D by means of the electric motor 58 and the winch cable 56.

It should be noted that when the table top is in its raised position, a limit switch 93 is closed and FIG. 4 shows this switch mounted on the frame A and in a position to be closed when the table top is in raised position. The switch 93 is in series with the switch 94 and when the latter switch is closed by the operator, the motor 58 will be connected to the battery 79 and will rotate the drum 57 slowly for winding the cable and pulling rearwardly on the U-shaped arm 51 and the lower vacuum cups Q and Q'. As previously stated, this movement is slow and while it is taking place, the operator can move the cross member 52a downwardly for raising the vacuum cups for lifting the glass sheet E and transferring the lower portion of the sheet from the casing to the rubber rollers D so that the lower glass edge will rest on the rollers. When the lower portion of the glass sheet strikes the sheet glass positioning members H, see FIG. 6A, the operator opens the switch 94 to stop the motor 58 and the drum 57 from operating. He lowers the glass sheet E on the rubber rollers D by raising the arm 51 and then he releases the vacuum in the lower cups Q and Q'.

The operator must now swing the upper portion of the glass sheet E out of the casing and onto the spherical balls G which are in operative position. He closes a switch 95, see FIG. 9, that is in series with the switch 93 and a closing of the switch 95 will open a solenoid controlled valve 96 and permit fluid under pressure to enter the hydraulic cylinder T for causing the piston rod 61 to move outwardly and extend the lazy-tong S, see FIGS. 8, 9 and 10. The lazy-tong will move the upper vacuum cup R into contact with the upper portion of the glass sheet E where the vacuum in the cup R will cause the cup to adhere to the glass. The switch 95 may be on the rear panel 76 and also on both side panels 77 and 78, see FIG. 3.

The operator next retracts the lazy-tong S and the vacuum cup R by closing a switch 97 that opens a solenoid valve 98 and this will cause hydraulic fluid to enter the opposite end of the cylinder T to retract the piston rod 61 and collapse the lazy-tong S. As the lazy-tong retracts, it will move the vacuum cup R to swing the upper end of the glass sheet E out of the casing, not shown, and onto the spherical balls G. The suction to the toping R is released and the lazy-tong moves the cup flush with the table top C.

It should be noted at this time that I have not described in detail the standard hydraulic mechanisms in FIG. 10 for a pressure control for the two floor locks M—M and the upper vacuum cup R and the pressure control is shown schematically at 99. These pressure control units limit the amount of hydraulic pressure applied to the various units. The hydraulic diagram also shows the bleed lines for conveying the hydraulic fluid from one end of the cylinders back to the tank 82 while fluid under pressure enters the opposite ends of the same cylinders. This is standard practice and requires no detailed description.

When the glass sheet E rests on the rubber rollers D and bears against the spherical balls G, the plane of the glass is at about a 5° angle from a vertical plane and it will not accidentally fall off from the tilted table top. The operator releases the floor locks M—M by closing the switches 100—100 and this will open the solenoid valves 101 and 101 for permitting the fluid in the cylinders for the floor locks to bleed back into the storage tank 82 as the springs, see FIG. 10, urge the floor lock pistons and piston rods back into retracted position. It is possible for the operator to move the device into any place desired before lowering the table top C or he may lower the table top without moving the device.

The operator in swinging the table top C back into a horizontal position closes the switch 102, see FIG. 9, and this opens solenoid valve 102 in FIG. 10 and permits the weight of the table top C to move the piston rods 32 back into their cylinders J—J and the counterbalancing of the springs L and associate mechanism will cause the table top to resume its horizontal position and rest upon the frame A. A means for decelerating the return movement of the table top as it nears its horizontal position can be incorporated in the device, but this is not shown in the drawings.

The spherical balls G support the sheet glass E above the upper surface of the table top and it is possible for the operator to cut the glass along desired lines that may extend in any direction and then insert an elongated board, not shown, adjacent to the line of cut and under the glass so that one edge of the board parallels the line of cut. The board has a greater width than thickness and the width of the board is greater than the distance between the upper surface of the table top and the undersurface of the glass. Therefore, when the operator rotates the board along its longitudinal axis to swing the greater width of the board into a vertical plane, the board will lift the glass sheet from its undersurface and adjacent to one side of the line of cut and cause the glass to be severed along this line. The glass sheets can be moved while supported by the balls G into any desired position and, if the operator wishes to lower a desired piece of glass sheet down upon the upper surface of the table top C, he can do so by swinging the desired arms 19 for swinging its associate line of spherical balls G down below the table top C. Also, the rubber rollers D may be removed when the glass is horizontally disposed.

I have already described in some detail how a glass sheet E can be removed edgewise from an open end of a casing of glass, not shown, and so a briefer final description of this type of operation will now be set forth. This feature will be claimed in my copending case, Ser. No. 306,720. The device with its table top in raised position is positioned about twelve to eighteen inches from the edge of the sheet of glass that is to be pulled from the casing. The rubber rollers D have already been placed in position on the table top. The upwardly inclined table top is lined up with the plane of the glass sheet. The right and left floor locks M—M can be individually actuated as shown by the two switches 89 in FIG. 9, one for each floor lock and the two solenoid valves 90—90, and for each floor lock. One floor lock M can be activated and the device swung around this floor lock as a pivot while bringing the plane of the raised table top C into proper relation with the plane of the glass sheet to be pulled from its case, not shown.

I have already described how the electric winch N can be swung into operative position, see FIG. 2A, and how the suction cup P can be attached to the glass sheet E. The cup P should be attached near the bottom of the glass sheet E, see FIG. 1. The operator stands near the winch and closes the winch switch 102, see FIG. 9, which will cause the winch cable 45 to pull on the cup P which in turn will pull the glass sheet E onto the rubber rollers D. After about one-half the length of the glass sheet has been moved onto the rubber rollers D, the operator may free the vacuum cup P from the lower portion of the sheet and reattach it at a higher level so that there will be a substantially straight horizontal pull between the cup P and the winch. The entire glass sheet is now moved onto the rubber rollers.

Next the operator frees the vacuum cup P from the sheet of glass E, and swings the winch back into an inoperative position behind the table top C, as shown by the dot-dash line position in FIG. 2A. The table top C is lowered into a horizontal position as previously explained. The glass sheet E is manually moved away from the rubber rollers D and these rollers are removed from their sleeves 6, see FIGS. 6 and 6B. The sheet glass E may be cut along a line at any desired angle and the glass broken along this line of cut. This has already been explained.

MODIFIED FORM

Figure 13:
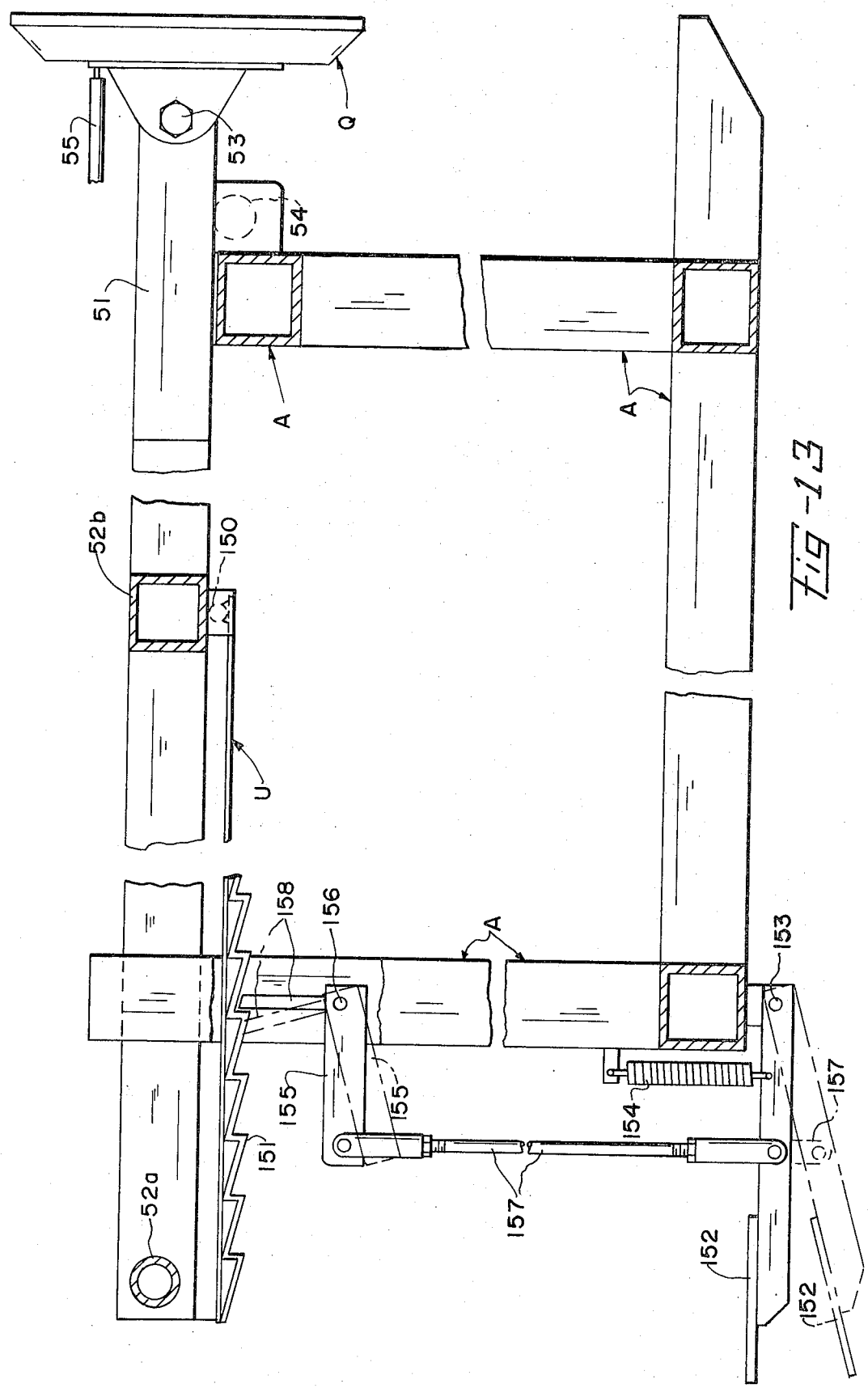
FIG. 13 is an enlarged transverse section taken along the line 13—13 of FIG. 12 and shows the foot actuated means for stepwise retracting the two lower vacuum cups.

In FIGS. 11, 12 and 13, I have a slightly modified form of my glass cutting table in which I provide manually actuated means for retracting the two lower vacuum cups Q and Q' from the dot-dash line position shown in FIG. 12, into the full line position. Also, the modified form shows the upper vacuum cup R' being movable by hand rather than by the lazy-tong S.

The U-shaped arm 51 supports the two lower vacuum cups Q and Q', as shown in FIG. 12, and the rearward portion 52 has its middle cross piece 52b pivotally supporting at 150 one end of a ratchet bar U, see also FIGS. 11 and 13. The ratchet bar U has a plurality of ratchet teeth 151 at its outer end and arranged on the underside of the bar. A pedal 152 has one end pivoted at 153 to the frame A and a spring 154 yieldingly urges the pedal into the full line position shown in FIG. 13. A pawl 155 is pivoted to the frame A at 156 and an adjustable link 157 interconnects the pawl with the pedal. The pawl 155 carries a rigid tooth 158 that engages the ratchet teeth 151, one tooth at a time as the pedal is actuated by the operator.

The operator first raises the rear cross piece 52a, see FIG. 11, and raises the ratchet bar U out of engagement with the pawl tooth 158 and then moves the U-shaped arm 51 forwardly while swinging its forward end downwardly so as to bring the lower suction cups Q and Q' into contact with a glass sheet E that is in a case, not shown. It is now possible to swing the rear cross piece 52a downwardly, as indicated by the dot-dash arrow 159 in FIG. 11 and permit the ratchet bar U to engage the pawl 155.

The operator now actuates the foot pedal 152 for stepwise moving the ratchet bar 151 and the U-shaped arm 51 rearwardly for causing the lower suction cups Q and Q' to move the lower part of the glass sheet E onto the rubber rollers D. The upper suction cup R' is mounted on the end of a long handle 160 and after the lower edge of the glass sheet E rests on the rubber rollers D, the operator can move the upper suction cup R' into contact with the upper portion of the glass sheet that is still lying within the casing, not shown. FIG. 11 shows a vacuum line 161 leading from the vacuum source, not shown, to the upper suction cup R' so that a sufficient vacuum is applied to the cup for causing it to adhere to the surface of the glass E. The operator can now pull the handle 160 rearwardly for swinging the upper portion of the glass sheet against the spherical balls G.

From this point the table top C is lowered in the manner already described and no further detailed operation of the glass cutting table will be necessary. The various parts of the modified form of the device shown in FIGS. 11, 12 and 13 that are similar to parts in the preferred form will be given similar reference characters.

I claim:
1. In combination:
   a. a portable frame;
   b. a table top pivotally connected to said frame and normally lying in a horizontal plane, said table top having openings therein;
   c. means for swinging said table top into an upwardly inclined position and for lowering it into a horizontal position;
   d. a plurality of sheet glass supporting rollers carried by said table top and arranged along the lower edge of the table top when the latter is in an upwardly inclined position;
   e. a plurality of sheet glass supporting and moving vacuum cups movable through the openings in said table top when the latter is in an upwardly inclined position; and
   f. means for selectively moving said vacuum cups into engagement with the face of a sheet of glass and for lifting and moving the glass sheet onto said table top so that the lower glass edge rests on said rollers.
2. The combination as set forth in claim 1: and in which
   a. sheet glass positioning members are associated with said rollers and are disposed adjacent thereto;
   b. means for moving said sheet glass positioning members from an inoperative position where they are disposed below the outer surface of the table top, into an operative position where they are disposed a slight distance above the table top surface and adjacent to said rollers.
3. The combination as set forth in claim 1: and in which
   a. a plurality of sheet glass supporting balls are arranged over the surface of the table top in spaced apart relation; and
   b. means for moving said balls from an inoperative position where they are disposed below the outer surface of the table top, into an inoperative position where they are disposed a slight distance above the table top surface so as to cooperate with said rollers in supporting the glass.

4. The combination as set forth in claim 1: and in which
 a. the means for selectively moving said vacuum cups includes
 b. a rocker arm fulcrummed on said portable frame and supporting two of the vacuum cups, the two cups being spaced laterally apart and the rocker arm extending rearwardly of said table top when the latter is in an upwardly inclined position;
 c. whereby said rocker arm can be manually moved forwardly for pressing the vacuum cups against the face of the glass sheet for causing them to adhere thereto whereupon the rocker arm can have its rear end moved downwardly for causing the glass attached vacuum cups to lift the sheet glass and also the arm may be moved rearwardly for moving the lower edge of the glass sheet onto the rollers.

5. The combination with claim 4: and in which
 a. power means is provided for moving the rocker arm rearwardly while still permitting the raising and lowering of the rear end of the rocker arm for effecting an opposite lowering and raising movement of the vacuum cups carried by the rocker arm; and
 b. means for making said power means operable only when said table top is in an upwardly inclined position.

6. The combination as set forth in claim 1: and in which
 a. said means for swinging said table top into an upwardly inclined position includes means for retarding the movement of said table top as it nears the end of its upward swinging movement.

7. The combination as set forth in claim 3: and in which
 a. the glass supporting rollers are removably mounted in said table top so that when the rollers are removed and the table top is in a horizontal position with said balls supporting the glass sheet, the sheet glass can be moved in a horizontal plane while being supported by said balls.

8. The combination as set forth in claim 1: and in which
 a. a pair of spaced apart floor stops are carried by said frame and lie in a vertical plane that parallels the pivotal axis line for the swingable table top; and
 b. separably controlled means for activating each floor stop for permitting either floor stop to be moved into contact with the floor whereby the operator can swing said frame about the activated floor stop as a pivot until the frame is in the desired position after which the other floor stop can be moved into floor contact to hold said frame from further movement until both floor stops are again moved into an inoperative position.

9. The combination as set forth in claim 4: and in which
 a. the means for selectively moving said vacuum cups further including
 b. a third upper vacuum cup disposed above said pair of vacuum cups when said tiltable table top is in an upwardly inclined position; and
 c. means for moving said third upper vacuum cup forwardly against the upper portion of the glass sheet after said pair of vacuum cups have moved the glass sheet lower edge onto said rollers whereupon said third upper vacuum cup moving means can move said third vacuum cup rearwardly for swinging the upper glass portion toward the upwardly inclined table top so as to be supported by the latter.

10. The combination as set forth in claim 9: and in which
 a. the said means for moving said third upper vacuum cup cannot be operated until auxiliary means is operated by the table top being swung into its upwardly inclined position whereupon the means for moving said third upper vacuum cup can be activated.

11. In a device of the type described;
 a. a portable frame;
 b. a table top pivotally mounted on said frame;
 c. a plurality of rods extending across the underside of the table top and being arranged in a spaced apart parallel arrangement, said rods being rockably carried by said table top;
 d. a plurality of standards carried by each rod and extending at right angles thereto, the standards for each rod lying in a plane that extends through the axis of the rod, said standards being spaced along said rod and each standard being of the same length;
 e. a freely rotatable ball mounted at the outer end of each standard, said table top having an opening disposed adjacent to each standard for permitting the standards to be swung from a position underlying the table top into a position where they project above the table top when the rods have rotated about their longitudinal axes; and
 f. means for rotating each rod for swinging its standards from an inoperative position where the standards and their balls underly the table top, into an operative position where the standards project through the table top openings and have their axes extending at right angles to the plane of the table top, the balls all lying in a plane that parallels the plane of the table top.

12. The combination as set forth in claim 11: and in which
 a. each rod has a sheet glass positioning member disposed at one end of the rod, the glass positioning member having a sheet glass contacting portion lying at the same distance from the rod axis as the balls are spaced from the same axis so that when the rods rotate the standards into operative position the sheet glass positioning members will likewise be moved so as to lie in the same plane as the balls; and
 b. a plurality of spaced apart rollers disposed adjacent to said sheet glass positioning members and having their axes extending at right angles to the plane of the top of said table top, said rollers being adapted to support an edge of a glass sheet that also bears against said balls and glass positioning members when they are in operative position.

13. In a device of the type described;
 a. a portable frame;
 b. a table top pivotally mounted on said frame;
 c. means for swinging said table top into an upwardly inclined position, the table top having an opening near the top of the table top when the latter is in its upwardly inclined position;

d. a pair of lazy tongs carried by the underside of the table top and adapted to project through the table top when said lazy tongs are extended e. a vacuum cup carried by said lazy tongs and adapted to be moved through the table top opening when said lazy tongs are extended and f. means for extending and retracting said lazy tongs for moving said vacuum cup into operative position or into inoperative position, said last-named means only being operable when said table top is in an upwardly inclined position.

14. The combination as set forth in claim 13: and in which a. said table top is provided with a plurality of rollers arranged adjacent to the lower edge of the table top when the latter is in an upwardly inclined position, the table top having a pair of spaced apart openings disposed a slight distance away from said rollers;

b. a pair of vacuum cups;

c. a retractable arm fulcrummed on said portable frame and having the pair of vacuum cups secured thereto, said arm being movable for advancing said pair of vacuum cups through said pair of spaced apart openings; and d. power means for retracting said arm with said pair of vacuum cups, said last-named power means only being operable when said table top is in an upwardly inclined position.

15. In combination:

a. a portable frame;

b. a table top pivotally mounted on said frame;

c. means for swinging said table top into an upwardly inclined position, the table top having a pair of spaced apart openings near its lower edges when the table top is in an upwardly inclined position;

d. a pair of vacuum cups;

e. a retractable arm fulcrummed on said portable frame and having the pair of vacuum cups secured thereto, said arm being movable for advancing said pair of vacuum cups through siad pair of spaced apart openings;

f. a ratchet bar pivotally connected to said retractable arm;

g. a pawl engagable with said ratchet bar; and h. a foot pedal actuated means operatively connected to said pawl for causing it to stepwise retract said ratchet bar and arm when said foot pedal is actuated.

* * * * *